United States Patent
Kuno

(10) Patent No.: US 6,473,125 B1
(45) Date of Patent: Oct. 29, 2002

(54) SOLID-STATE IMAGING DEVICE WITH SHUTTER OPERATION IN SYNC WITH SIGNAL CHARGE RESET AND METHOD OF DRIVING SAME

(75) Inventor: Yoshinori Kuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/987,387

(22) Filed: Dec. 9, 1997

(30) Foreign Application Priority Data

Dec. 10, 1996 (JP) .............................. 8-329924

(51) Int. Cl.⁷ .............................................. H04N 5/335
(52) U.S. Cl. ...................................................... 348/296
(58) Field of Search ................................ 348/220, 221, 348/222, 229, 230, 294, 295, 296, 297, 298, 300, 301, 311, 312, 313, 314; H04N 5/335

(56) References Cited

U.S. PATENT DOCUMENTS 5,488,416 A * 1/1996 Kyuma ........................ 348/296
5,585,848 A * 12/1996 Hieda et al. ................. 348/297
5,894,325 A * 4/1999 Yonemoto ................... 348/302

FOREIGN PATENT DOCUMENTS

WO    WO 92/06564    4/1992
WO    WO 93/25042    12/1993

OTHER PUBLICATIONS

Measurement Science and Technology, "A simple and low –cost CCD–based imaging system", No. 4, Bristol, GB Apr. 1992, M.D. Slessor et al.

IEEE Transactions on Consumer Electronics, "A 7k–Pixel×3 Line Color Linear Sensor With Single–Side Readout Method", Kuno et al., vol. 41, No. 3, Aug. 1995.

* cited by examiner

Primary Examiner—Tuan Ho
(74) Attorney, Agent, or Firm—Sonnenschein, Nath & Rosenthal

(57) ABSTRACT

A solid-state imaging device includes a sensor portion for accumulating a signal charge produced by photoelectric conversion, a charge transfer register for transferring the signal charge, a charge/voltage converting portion connected to the charge transfer register, and a means for carrying out a shutter operation for discharging the charge accumulated by the sensor portion in synchronization with a signal charge reset period of the charge/voltage converting portion.

19 Claims, 4 Drawing Sheets

SOLID-STATE IMAGING DEVICE WITH SHUTTER OPERATION IN SYNC WITH SIGNAL CHARGE RESET AND METHOD OF DRIVING SAME

BACKGROUND OF THE INVENTION

1. Field of the Invention

The present invention relates to a solid-state imaging device such as a CCD linear sensor, a CCD area sensor or the like and a method for driving such a solid-state imaging device.

2. Description of the Related Art

It has been proposed that in a color CCD linear sensor having a plurality of sensor lines be provided with a shutter function by which the amplitudes of a plurality of signals from the sensor lines can be controlled.

A main purpose of such a shutter function is, for example, it use in a color linear sensor having three sensor lines of R(red), G(green) and B(blue), to adjust the white balance of the output voltages from the R, G and B sensors. If the same accumulating time is set, the magnitudes of each of the R, G and B output voltages are different depending on their sensitivities. This leads to the difference of dynamic range in the R, G and B output voltages.

In order to cope with this problem, a correction is performed such that in the latter stage of the signal processes. the output levels are arranged by varying each of the gains of R, G, B and, particularly if a higher quality of an image is required, the output levels of RGB are required to be arranged before the adjustment of gain, namely, just at the CCD output.

Accordingly such a method is used in which if it is assumed that $\tau_{ROG}$ is a period from a time when a reading gate pulse is applied to a time when the next reading gate pulse is applied, the $\tau_{ROG}$ is set to a charge accumulating period to the sensor portion (this is defined as 1H period), and then an effective accumulating period each of the R,G,B is varied by a shutter pulse input.

A 1H period consists of a period for transferring a signal charge, namely, an effective signal period and the subsequent non-transfer period.

In a prior art, when this effective accumulating period is to be set, the input of the shutter pulse (for example, of making the shutter pulse off) is set in the period other than the effective signal period, namely, the non-effective period. That is, if the effective signal period is set as the input period of the shutter pulse, for example, a potential of a common semi-conductor well area on a semi-conductor substrate side fluctuates as a result of the input of shutter pulse and therefore the wave form of an output signal also fluctuates owing to the influence of the coupling of shutter pulse to affect on the quality of an image. Accordingly, the input time of the shutter pulse is set in a so-called non-transfer period other than the effective signal period.

However, if the input time of the shutter pulse is set in the non-transfer period other than the effective signal period, a variable range of the signal charge accumulating time is so limited that there is no marginal time, because the remaining period the shutter operation becomes is a signal charge accumulating time. Accordingly, if the effective accumulating time is to be set longer, the $\tau_{ROG}$ is set as a longer time and the non-transfer period must be made long. At this time, such a drawback is produced that the signal processing time on a set increases.

SUMMARY OF THE INVENTION

In view of such aspect, it is an object of the present invention to propose a solid-state imaging device and a method of driving such a solid-state imaging device which enables the shutter operation at anytime in and out of the effective signal period.

According to a first aspect of the present invention, a solid-state imaging device includes a sensor portion for accumulating a signal charge produced by photoelectric conversion, a charge transfer register for transferring the signal charge, a charge/voltage converting portion connected to the charge transfer register, and a means for carrying out a shutter operation for discharging the charge accumulated by the sensor unit in synchronization with a signal charge reset period of the charge/voltage converting portion.

According to a second aspect of the present invention, a method is one of driving a solid-state imaging device having a sensor portion for accumulating a signal charge generated by photoelectric conversion, a charge transfer register, and a charge/voltage converting portion connected to the charge transfer register. The method includes a step of carrying out a shutter operation for discharging a charge accumulated by the sensor portion in synchronization with a reset period of the charge/voltage converting portion.

According to a third aspect of the present invention, a method is one of driving a solid-state imaging device having a plurality of sensor portions and a plurality of sensor lines for accumulating charges generated by photoelectric conversion and a plurality of charge transfer registers for transferring the signal charges and a charge/voltage converting portion connected to the plurality of charge transfer registers. The method includes a step of carrying out a shutter operation for discharging the charges accumulated by the sensor lines in synchronization with a reset period of the charge/voltage converting portion.

DESCRIPTION OF THE PREFERRED EMBODIMENTS

A solid-state imaging device according to the present invention comprises a sensor portion, a charge transfer register, and means for performing a shutter operation in synchronism with a reset period of a charge voltage converter portion.

The solid-state imaging device according to the present invention is a linear sensor having a plurality of sensor lines and being capable of controlling the amplitude of output signals from the sensor lines by a shutter function, and a means for performing a shutter operation in each sensor line in synchronism with the reset period of the charge voltage converter portion.

A method of driving a solid state image sensor according to the present invention enables to perform a shutter operation in synchronism with the reset period of the charge voltage converter portion.

An embodiment of the present invention will be described below in reference with the drawings.

Figure 1:
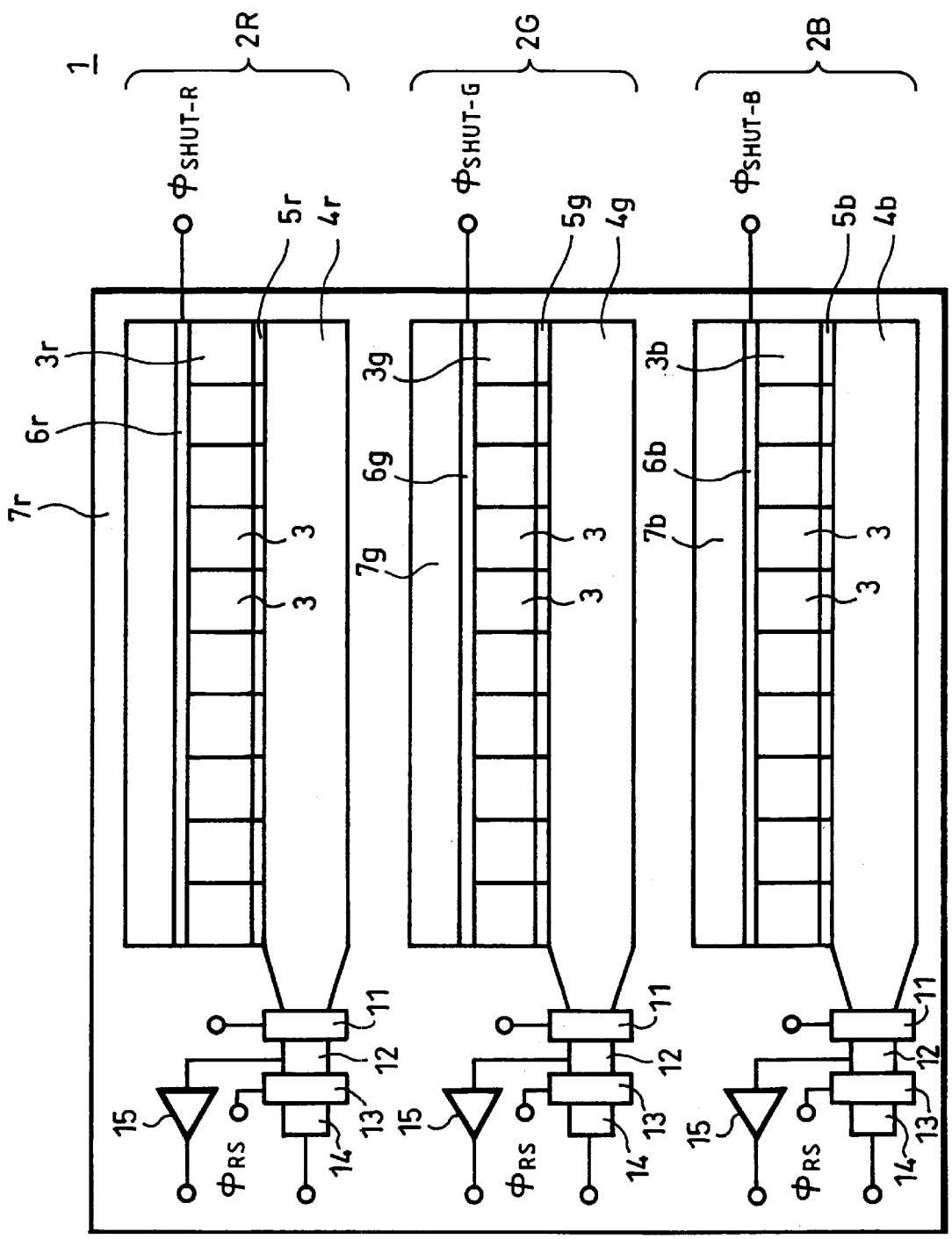
FIG. 1 is a diagram showing a color CCD linear sensor according to the present invention.

FIG. 1 shows an embodiment of the present invention which is incorporated in a color CCD linear sensor. In FIG. 1, a color CCD linear sensor is generally designated by reference numeral 1. The color CCD linear sensor 1 is formed of a plurality of sensor lines, in this embodiment three sensor lines, which are comprised of a single linear sensor (an image element), namely, a R(red) linear sensor 2R, a G(green) linear sensor 2G and a B(blue) linear sensor 2B.

The R linear sensor 2R, the G linear sensor 2G and the B linear sensor 2B have a R sensor array 3r, a G sensor array 3g and a B sensor array 3b respectively, each array including a plurality of sensor portions 3. On one sides of the sensor arrays 3r, 3g and 3b there are provided charge transfer registers (which are referred to as CCD registers) 4r, 4g and 4b, which are for example constructed as two-phase drive CCDs, via reading gate portions 5r, 5g and 5b respectively while on the other sides of the sensor arrays 3r, 3g and 3b there are provided shutter drain regions 7r, 7g and 7b via shutter gate portions 6r, 6g and 6b respectively.

Adjacent to the end stage of each of the CCD registers 4r, 4g, 4b, an output gate portion 11 and a floating diffusion region 12 which becomes a charge voltage converter unit are formed and further, a reset gate portion 13 and a reset drain 14 adjoining the floating diffusion region are formed. An output circuit 15 is connected to the floating diffusion region 12.

A reading gate pulses $\phi_{ROG}$ is applied to the reading gate portions 5r, 5g and 5b, a reset pulse $\phi_{ROG}$ is applied to the reset gate portion 13 and a fixed voltage is applied to the output gate portion 11.

Two-phase drive clock pulses $\phi_1$ and $\phi_2$ are applied to the CCD registers 4r, 4g and 4b and particularly a drive clock pulse $\phi_{LH}$ which is the same to the $\phi_1$ is applied to the end stage of the transfer portion.

On the other hand, a shutter means is formed of each of the shutter gate portions 6r, 6g and 6b and the shutter drain regions 7r, 7g and 7b. When shutter pulses $\phi_{SHUT-R}$, $\phi_{SHUT-G}$ and $\phi_{SHUT-B}$ (See FIG. 2) are applied to the shutter gate portions 6r, 6g and 6b respectively, the signal charges which have been accumulated in the sensor arrays 3r, 3g and 3b are discharged to the shutter drain regions 7r, 7g and 7b via the shutter gate portions 6r, 6g and 6b respectively.

Figure 2:
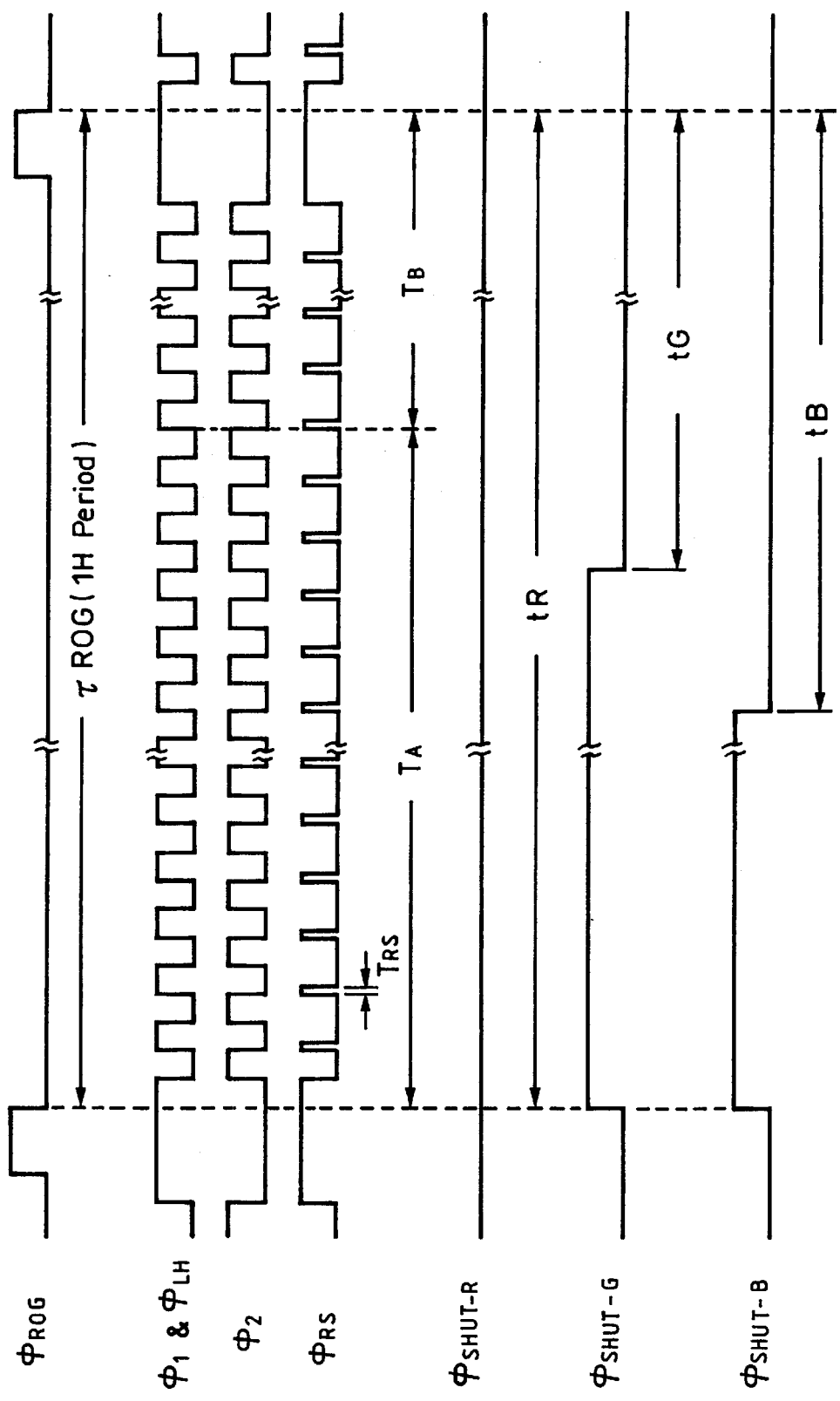
FIG. 2 is a timing chart of input pulses to the color CCD linear sensor according to the present invention.

As shown in FIG. 2, in this color CCD linear sensor 1, the period from the time when the reading gate pulse $\phi_{ROG}$ is applied to the time when the subsequent reading gate pulse $\phi_{ROG}$ is applied is $\tau_{ROG}$ and this $\tau_{ROG}$ is set as a period for accumulating the charge in the sensor portion 3 (which is defined as 1H period). This 1H period consists of an effective signal period $T_A$ for transferring and outputting the signal charge and the subsequent non-transfer period $T_B$.

In the color CCD linear sensor 1, the signal charges which have been accumulated in the respective sensor arrays 3r, 3g and 3b by means of photo-electric conversion are read simultaneously to the CCD registers 4r, 4g and 4b respectively by applying the reading gate pulse $\phi_{ROG}$ to the reading gate portions 5r, 5g and 5b. If the two-phase drive clock pulses $\phi_1$, $\phi_2$ and $\phi_{LH}$ are applied to the CCD registers 4r, 4g and 4b, the charges are transferred during the effective signal period $T_A$ of FIG. 2 and the signal charge at each one pixel (sensor portion) is read via the floating diffusion regions 12 as an output signal by the output circuit 15. The floating diffusion region 12 is reset when the reset pulse $\phi_{RS}$ is supplied to the reset gate portions 13 at each pixel.

The non-transfer period $T_B$ from the end of the effective signal period $T_A$ and before the subsequent reading gate pulse $\phi_{ROG}$ is applied is a state such that no charge is transferred.

Thus, according to the present embodiment, at any time during the 1H period, namely, whether during the effective signal period $T_A$ or the non-transfer period $T_B$, the input of the shutter pulses $\phi_{SHUT-R}$, $\phi_{SHUT-G}$, and $\phi_{SHUT-B}$ can be performed. At this time, the shutter pulses $\phi_{SHUT-R}$, $\phi_{SHUT-G}$ and $\phi_{SHUT-B}$ are input in synchronism with the reset period To of the floating diffusion region 12 or the charge voltage converter portions. In this way, the shutter operation can be performed during the reset period $T_{RS}$ of the reset pulse $\phi_{RS}$.

Figure 3:
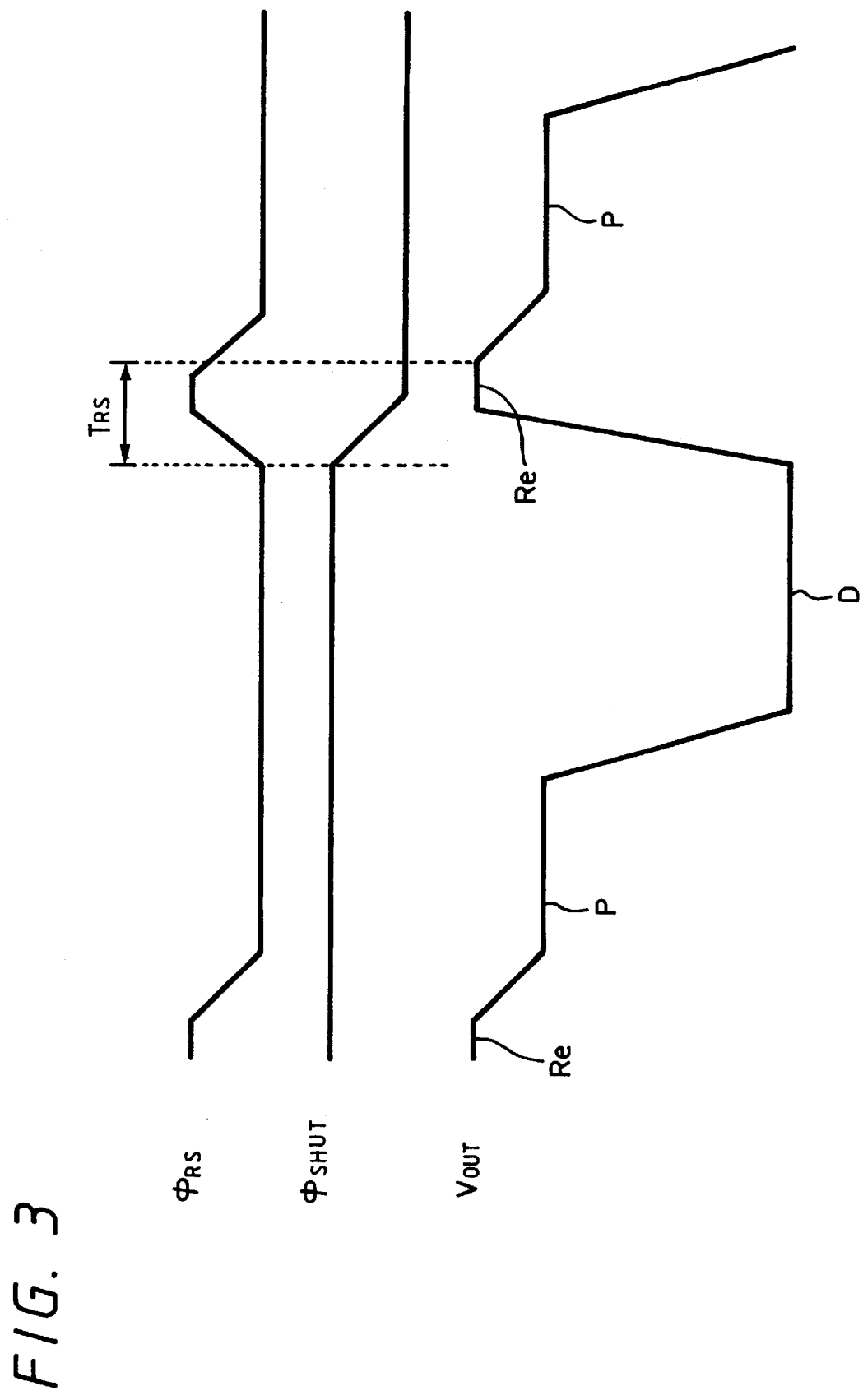
FIG. 3 is a timing chart showing examples of a reset pulse $\phi_{RS}$, a shutter pulse $\phi_{SHUT}$ and an output wave form $V_{OUT}$ according to the present invention.

For example, in the embodiment of FIG. 3, during the period $T_{RS}$ when the reset pulse $\phi_{RS}$ is applied in the effective signal period $T_A$, the shutter pulse $\phi_{SHUT}$ is off.

Figure 4:
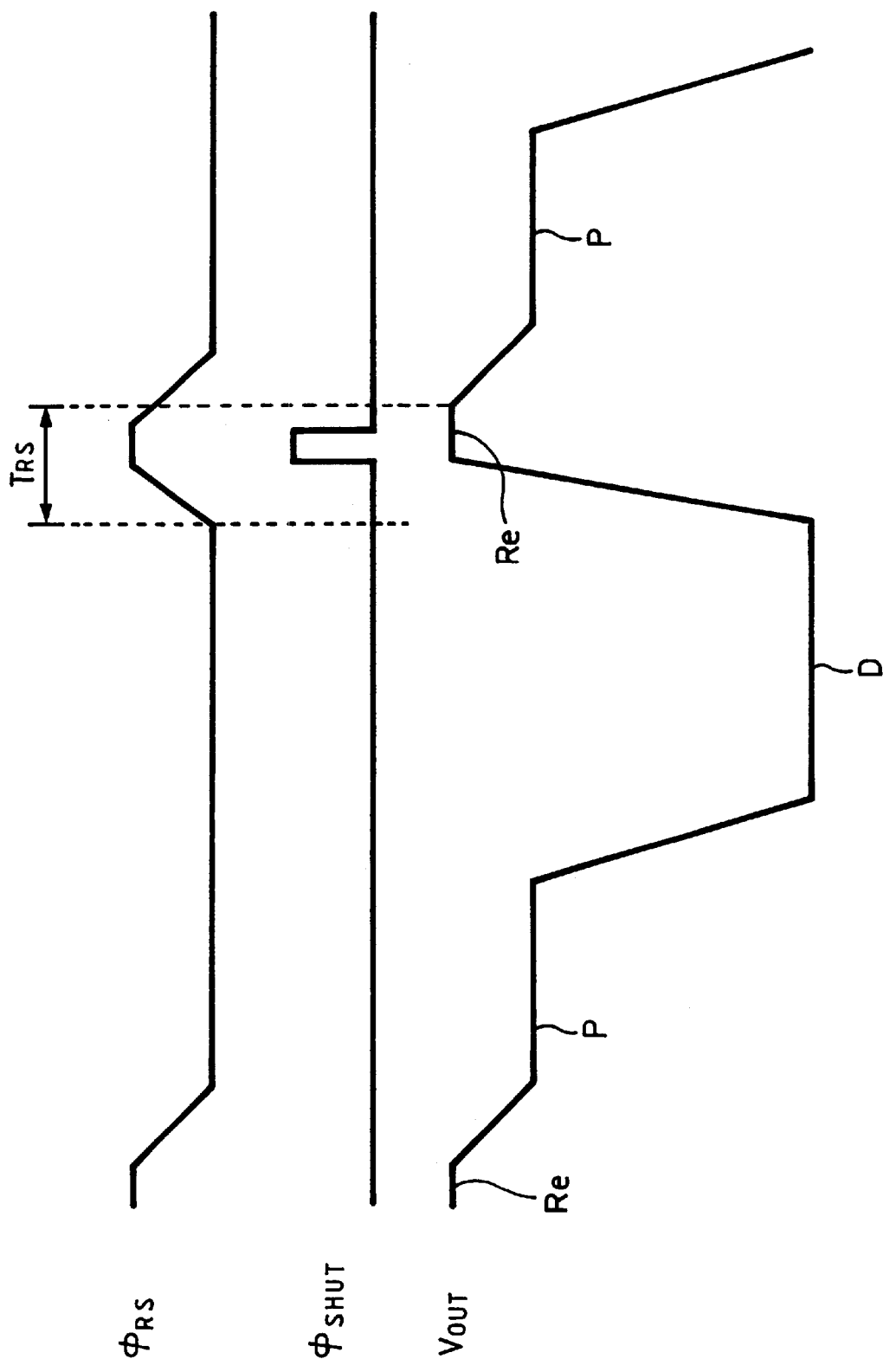
FIG. 4 is a timing chart showing other examples of the reset pulse $\phi_{RS}$, the shutter pulse $\phi_{SHUT}$ and the output wave form $V_{OUT}$ according to the present invention.

In the embodiment of FIG. 4, the shutter pulse $\phi_{SHUT}$ is applied during the period $T_{RS}$ when the reset pulse $\phi_{RS}$ is applied in the effective signal period $T_A$.

In the embodiment shown in FIG. 2, the shutter pulse $\phi_{SHUT-R}$ is not input to the R linear sensor 2R which has the lowest sensibility among the R linear sensor 2R, the G linear sensor 2G and the B linear sensor 2B, but the shutter pulses $\phi_{SHUT-G}$ and $\phi_{SHUT-B}$ are input to the G linear sensor 2G and the B linear sensor 2B respectively. In this case, the effective accumulating times of the R linear sensor 2R, the G linear sensor 2G and the B-linear sensor 2B become $t_R$, $t_G$ and $t_B$ respectively.

In this way, if the shutter pulses $\phi_{SHUT}$ ($\phi_{SHUT-G}$, $\phi_{SHUT-B}$) are input in synchronism with the reset period $T_{RS}$, the influence of the coupling is produced only in a reset phase Re in an output wave form $V_{OUT}$ of FIG. 3 and FIG. 4 but no influence of the coupling is produced in a precharge phase P and a data phase D which are required in a correlation double sampling circuit (CDS) for removing a noise.

Accordingly, the input times of the shutter pulses $\phi_{SHUT}$ ($\phi_{SHUT-R}$, $\phi_{SHUT-G}$ and $\phi_{SHUT-B}$) can be set at any time in the 1H period whether in or out the effective signal period $T_A$ and therefore the variable ranges of the effective accumulating times $t_R$, $t_G$ and $t_B$ of respective colors by the shutter control can be set wider than that of the prior art. Further, the influence of the coupling of the shutter pulses $\phi_{SHUT}$ on the wave form of output signal can be suppressed.

In the above embodiment, the floating diffusion region is used as the charge voltage converter portion, but the floating gate or the like can be also used.

In the above embodiment, the present invention is applied to the color CCD linear sensor 1 having three single linear sensors 2R, 2G and 2B but may be applied to a color CCD linear sensor having a plurality of, other than three, single linear sensors. Further, the present invention can be applied to a single color linear sensor.

The present invention can also be applied to a CCD area sensor. In this case, the shutter operation is performed in synchronism with the reset period of the charge voltage converter portion which is connected to a horizontal transfer register.

According to the present invention, the influence of the coupling based on the shutter operation is not affected on the wave form of output signal and the shutter operation can be performed at anytime of the period including the period of reading a signal. Accordingly, the variable range of the effective accumulating period by the shutter control can be set wider than that of the related art.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A solid-state imaging device, comprising:
    a sensor portion for accumulating a signal charge produced by photoelectric conversion;
    a charge transfer register for transferring said signal charge;
    a charge/voltage converting portion connected to said charge transfer register; and
    a means for carrying out a shutter operation for discharging the charge accumulated by said sensor portion to a shutter drain portion via a shutter gate portion electrically coupled to said sensor portion by applying a shutter pulse to the shutter gate portion so that a transition of the shutter pulse is within a signal charge reset period of said charge/voltage converting portion, a reset pulse being applied to the charge/voltage converting portion during the signal charge reset period.

2. A solid-state imaging device according to claim 1, further comprising:
    a plurality of line sensors, wherein said means for carrying out the shutter operation discharges a charge accumulated by a line sensor having a higher sensitivity as compared with a line sensor having the lowest sensitivity among those of said plurality of line sensors.

3. A solid-state imaging device according to claim 1, wherein a charge reset is carried out by applying a reset pulse to said charge/voltage converting portion during said signal charge reset period.

4. A solid-state imaging device according to claim 3, wherein said means for carrying out the shutter operation applies a shutter pulse during a period when said reset pulse is applied to said charge/voltage converting portion.

5. A solid-state imaging device according to claim 3, wherein said means for carrying out the shutter operation sets a shutter pulse in its off level during the period when said reset pulse is applied to said charge/voltage converting portion.

6. A solid-state imaging device according to claim 1, wherein said charge/voltage converting portion comprises a floating diffusion portion.

7. A solid-state imaging device according to claim 1, wherein said charge/voltage converting portion comprises a floating gate.

8. A method of driving a solid-state imaging device having a sensor portion for accumulating a signal charge generated by photoelectric conversion, a charge transfer register, a charge/voltage converting portion connected to said charge transfer register, and a shutter drain portion connected to said sensor portion via a shutter gate portion comprising the steps of:
    carrying out a shutter operation for discharging a charge accumulated by said sensor portion to the shutter drain portion via the shutter gate portion by applying a shutter pulse to the shutter gate portion so that a transition of the shutter pulse is within a signal charge reset period of said charge/voltage converting portion, a reset pulse being applied to the charge/voltage converting portion during the signal charge reset period.

9. A method of driving a solid-state imaging device according to claim 8, wherein said solid-state imaging device comprises a plurality of line sensors, and in said shutter operation a charge accumulated by a line sensor having a higher sensitivity as compared with a line sensor the lowest sensitivity among those of said plurality of line sensors.

10. A method of driving a solid-state imaging device according to claim 8, wherein a charge reset is carried out by applying a reset pulse to said charge/voltage converting portion during said signal charge reset period.

11. A method of driving a solid-state imaging device according to claim 8, wherein said means for carrying out the shutter operation applies a shutter pulse during a period when said reset pulse is applied to said charge/voltage converting portion.

12. A method of driving a solid-state imaging device according to claim 10, wherein said means for carrying out the shutter operation sets a shutter pulse in its off level during the period when said reset pulse is applied to said charge/voltage converting portion.

13. A method of driving a solid-state imaging device according to claim 8, wherein said charge/voltage converting portion comprises a floating diffusion portion.

14. A method of driving a solid-state imaging device according to claim 8, wherein said charge/voltage converting portion comprises a floating gate.

15. A method of driving a solid-state imaging device having a plurality of line sensors each of which has a sensor line with a plurality of sensor portions for accumulating charges generated by photoelectric conversion and a charge transfer register for transferring said signal charges and a charge/voltage converting portion connected to said plurality of charge transfer registers and a shutter drain portion connected to said plurality of sensor portions via a shutter gate portion, comprising the steps of:
    carrying out a shutter operation for discharging the charges accumulated by said sensor lines to the shutter drain portion via the shutter gate portion by applying a shutter pulse to the shutter gate portion so that a transition of the shutter pulse is within a signal charge reset period of said charge/voltage converting portion, a reset pulse being applied to the charge/voltage converting portion during the signal charge reset period.

16. A method of driving a solid-state imaging device according to claim 15, wherein said solid-state imaging device comprises a plurality of line sensors, and in said shutter operation a charge accumulated by a line sensor having a higher sensitivity as compared with a line sensor having the lowest sensitivity among those of said plurality of line sensors.

17. A method of driving a solid-state imaging device according to claim 15, wherein a charge reset is carried out by applying a reset pulse to said charge/voltage converting portion during said signal charge reset period.

18. A method of driving a solid-state imaging device according to claim 15, wherein said means for carrying out the shutter operation applies a shutter pulse during a period when said reset pulse is applied to said charge/voltage converting portion.

19. A method of driving a solid-state imaging device according to claim 15, wherein said means for carrying out the shutter operation sets a shutter pulse in its off level during the period when said reset pulse is applied to said charge/voltage converting portion.

* * * * *